Feb. 4, 1969  T. P. LAYENDECKER  3,425,217
APPARATUS FOR PRESSURIZING ROCKET MOTOR PROPELLANT TANKS
Filed Feb. 6, 1967

TO PROPELLANT TANKS

INVENTOR.
THOMAS P. LAYENDECKER
BY Edwin D. Grant

United States Patent Office 3,425,217
Patented Feb. 4, 1969

3,425,217
APPARATUS FOR PRESSURIZING ROCKET MOTOR PROPELLANT TANKS
Thomas P. Layendecker, Jersey City, N.J., assignor to Thiokol Chemical Corporation, Bristol, Pa., a corporation of Delaware
Filed Feb. 6, 1967, Ser. No. 614,094
U.S. Cl. 60—39.48    3 Claims
Int. Cl. F02g *1/06, 3/00;* F02k *9/00*

ABSTRACT OF THE DISCLOSURE

Apparatus for pressurizing rocket propellant storage tanks with gas generated by combustion of two solid grains having different burning rates. A first conduit connects two casings holding respective ones of the aforesaid grains, and a branch conduit connects this first conduit to propellant tanks. When the pressure in the latter reaches a predetermined level, a pressure rupture diaphragm vents the first casing to the atmosphere, and a check valve in the conduit closes to prevent venting of gas from the propellant tanks and the second casing.

---

This invention relates to rocket motors and more particularly to an improved system for pressurizing the propellant storage tanks of liquid propellant rocket motors.

When the propellant tanks of liquid propellant rocket motors are pressurized by gas generators of the conventional type comprising a single combustible grain, or charge, of solid oxidizer and fuel, the rate of gas generation of the grain must be relatively low so that the propellant tanks will not be over-pressurized as propellant is expelled therefrom. However, to provide the rapid increase in pressure within propellant tanks that is desirable at the time a rocket motor is started, the pressurizing system for the tanks must be capable of generating a larger volume of gas in a given time than can be produced by gas generators employing a single, slow-burning grain.

It is accordingly an object of this invention to provide an improved apparatus for pressurizing the propellant storage tanks of liquid propellant rocket motors.

Another object of the invention is to inject gas rapidly into a propellant tank during the initial portion of the firing period of a liquid propellant rocket motor, and to automatically reduce the flow of gas into the same propellant tank after the pressure therein reaches a predetermined pressure level.

An additional object of this invention is to provide an uncomplicated, reliable system by means of which gas generated by the combustion of a fast-burning grain is used to pressurize the propellant tanks of a liquid propellant rocket motor when the latter is started, and by means of which the flow of this gas is automatically cut off when the pressure in said propellant tanks reaches a predetermined level and thereafter gas generated by the combustion of a slower-burning grain is used to pressurize the tanks.

Figure 1:
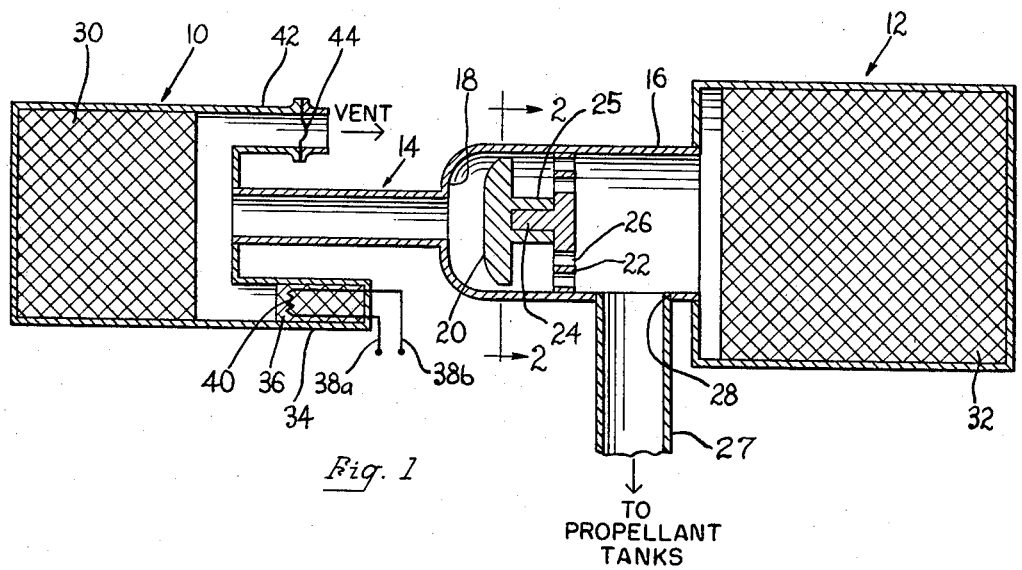
Figure 2:
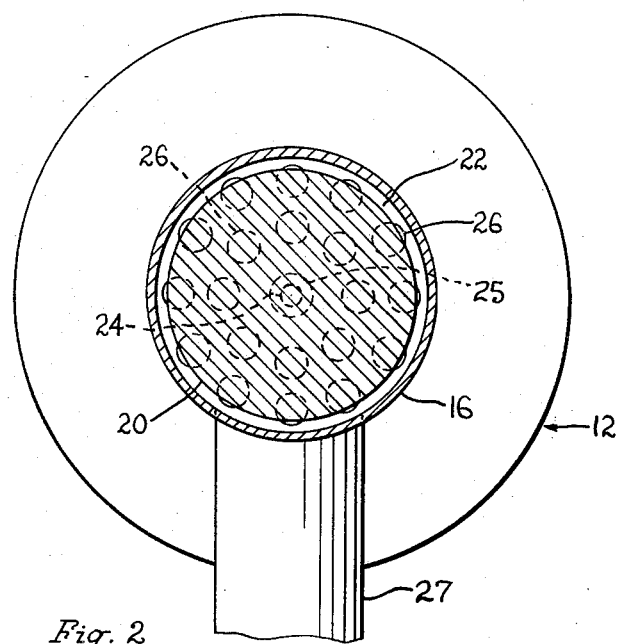

The aforesaid objects are achieved by a preferred embodiment of the invention comprising two casings one of which contains a grain with a relatively high burning rate and the other of which contains a grain with a lower burning rate, a first conduit connecting said casings, a second conduit connecting said first conduit to the propellant tanks of a rocket motor, means in said first conduit permitting gas flow from the casing containing the fast-burning grain to said second conduit and the other of said casings and adapted to cut off this gas flow when the ullage of said propellant tanks has been pressurized, means for igniting the fast-burning grain, and means for relieving pressure, at a predetermined pressure level, in the casing containing the latter grain. The components of the preferred embodiment and their manner of operation will be described in detail in the following specification, in which reference is made to the accompanying drawings wherein:

FIGURE 1 is a sectional view illustrating a preferred embodiment of the invention, the view being taken along the longitudinal axis of certain coaxial components thereof; and FIGURE 2 is a cross-sectional view of the same embodiment taken along the plane represented by line 2—2 in FIGURE 1 and in the direction indicated by arrows in the latter drawing.

As illustrated in FIGURE 1, a preferred form of the present invention comprises first and second cylindrical casings, respectively generally designated by the number 10, 12, which are communicatively connected by a first conduit 14. The portion 16 of first conduit 14 adjacent second casing 12 has a larger diameter than the portion of said conduit adjacent first casing 10, and the inner wall of this portion 16 is formed with a circumferentially extending seating surface 18 at the juncture of the two sections of the conduit. Disposed within portion 16 of conduit 14 is a disk 20 the curved peripheral surface of which matingly engages seating surface 18 when the disk is moved toward first casing 10, as will be described hereinafter in the discussion of the operation of the apparatus. The distance that disk 20 can move away from seating surface 18 is limited by a retaining member 22 fixedly positioned within the orifice of portion 16 of conduit 14 and disposed transversely thereof, said retaining member having a centrally disposed boss 24 thereon which is disposed within the aperture of a cylindrical guide member 25 that projects from the side of said disk facing said retaining member. The diameter of the aperture in guide member 25 is such that disk 20 can move freely toward or away from retaining member 22. A plurality of apertures 26 are formed in retaining member 22 to permit gas flow from first casing 10 toward second casing 12. As can be seen in FIGURE 2, there is an annular gap between the peripheral surface of disk 20 and the inner wall of conduit 16 when the end of guide member 25 abuts retaining member 22 as illustrated.

One end of a second conduit 27 is fixedly positioned with an orifice 28 located in the wall of portion 16 of conduit 14 between retaining member 22 and second casing 12. The other end of second conduit 27 communicates with the fuel and oxidizer storage tanks of the liquid propellant rocket motor in which the apparatus is incorporated Fixedly disposed within first and second casings 10, 12 respectively, are first and second pressurizing grains 30, 32 each of which is formed of a combustible composition of solid fuel and oxidizer. The particular composition of the pressurizing grains 30, 32 that is employed in the pressurizing system depends upon such factors as the size of the rocket motor in which the system is to be used and the manner in which this rocket motor is to be operated. However, for reasons which will become manifest hereinafter, the rate of gas generation produced by combustion of pressurizing grain 30 must be greater than that of pressurizing grain 32. Typically, the rate of gas generation of pressurizing grain 30 is about 2 pounds per second, whereas the rate of gas generation of pressurizing grain 32 is about 0.2 pound per second.

The end closure of first casing 10 adjacent the burning surface of pressurizing grain 30 is formed with a cylindrical housing 34 in which a squib igniter 36 is held, electrical leads 38a, 38b being connected to a bridgewire 40 embedded in said squib igniter and to conventional means (not shown) for supplying electric current at a selected time. One end of a third conduit 42 is also fixedly connected to the same end closure, the orifice of this conduit being initially closed by a diaphragm 44 that is adapted to rupture when the pressure within first casing 10 reaches a predetermined level.

It will be recognized that structural components of the above-described preferred embodiment of the invention may be formed of different metals or other suitable materials.

Operation of the propellant tank pressurizing system is initiated by firing squib igniter 36 to ignite first pressurizing grain 30. The hot gas generated by combustion of this grain flows through the check valve in first conduit 14 (i.e., the assembly comprising disk 20 and retaining member 22) and rapidly pressurizes the propellant tank ullage and second casing 12. When the ullage pressure reaches the ignition pressure of second pressurizing grain 32, this grain ignites and adds to the rate of pressurization of the ullage. By proper design and sizing of first and second conduits 14, 27, disk 20 and retaining member 22 for a particular rocket motor propellant tank arrangement, the pressure differential between the interior of first casing 10 and the propellant tank ullage can be made small. When the propellant tank ullage pressure rises to a level near the pressure required for expulsion of propellant from the tanks, diaphragm 44 in third conduit 42 ruptures and the pressure within first casing 10 drops rapidly to an equilibrium pressure dependent upon factors such as the burning area of first grain 30 and the flow area of diaphragm 44 through which gas generated by combustion of said first grain is vented to the atmosphere (or to space). Thus the pressure on the side of disk 20 facing first casing 10 becomes less than the pressure on the side of said disk facing second casing 12, causing the disk to seat against seating surface 18 and preventing flow of the gas generated by combustion of second grain 32 into first casing 10 and thence through conduit 42 to the atmosphere. Operation of the pressurizing system thereafter continues at the pressure maintained by the burning of second grain 32. After first grain 30 has been completely burned the pressure within first casing 10 will be equal to the pressure outside said first casing, and the seating pressure on disk 20 is then the rated propellant tank expulsion pressure.

It has been found that the above-described arrangement of the preferred embodiment of the invention effectively provides rapid pressurization of the ullage of propellant storage tanks of liquid propellant rocket motors, followed by continued pressurization of the tanks at a low gas flow rate. A particular advantage of the invention is that the arrangement of the components of the pressurizing system permits the rapid start of a liquid propellant rocket motor without over-pressurization of the propellant storage tanks thereof regardless of the initial ullage existing in said tanks. Also the components of the disclosed pressurizing system are light, easy to manufacture and install, and reliable in operation. Furthermore, the invention has utility in packaged liquid propellant rocket motors requiring rapid starting over a wide range of propellant tank ullage corresponding to many different temperatures.

Obviously modifications can be made to the above-described embodiment of the invention without departing from the inventive concepts thereof. For example, in some applications of the invention retaining member 22 may be replaced by bars disposed transversely across the orifice of the larger-diameter portion 16 of first conduit 14. Hence it is to be understood that the scope of the invention is limited only by the terms of the claims appended hereto.

What is claimed is:

1. In a rocket motor, apparatus for pressurizing a propellant storage tank comprising:

first and second casings;

a first conduit communicatively connecting the interiors of said first and second casings;

a check valve disposed in said first conduit and adapted to permit fluid flow from said first casing to said second casing and to prevent fluid flow from said second casing to said first casing;

a second conduit one end of which communicates with the portion of the passage of said first conduit disposed between said check valve and said second casing and the other end of which communicates with the interior of said propellant storage tank;

a first combustible pressurizing grain disposed within said first casing;

a second combustible pressurizing grain disposed within said second casing and having a lower rate of gas generation than said first grain;

means for igniting said first grain at a selected time; and means for venting from said first casing, when the pressure therein reaches a predetermined level, gas generated by the combustion of said first grain .

2. Apparatus as defined in claim 1 wherein said check valve comprises a circumferentially extending seating surface on the inner wall of said first conduit, a disk disposed within said first conduit and having a peripheral surface adapted to matingly engage said seating surface, and means for limiting the distance said disk can be moved away from said seating surface.

3. Apparatus as defined in claim 1 wherein said means for venting said first casing comprises an orifice in the wall of said first casing and a diaphragm fixedly disposed in said orifice and adapted to rupture when the pressure in said first casing reaches said predetermined pressure level.

References Cited

UNITED STATES PATENTS

| | | | |
|---|---|---|---|
| 2,780,389 | 2/1957 | Sandgren | 60—39.47 |
| 2,940,256 | 6/1960 | Conyers | 60—39.48 |
| 3,133,410 | 5/1964 | Gessner | 60—39.47 |
| 3,230,703 | 1/1966 | Sherman | 60—39.48 |

MARTIN P. SCHWADRON, *Primary Examiner.*

DOUGLAS HART, *Assistant Examiner.*

U.S. Cl. X.R.

60—39.14, 39.47